US009268010B2

(12) United States Patent
Jeon (10) Patent No.: US 9,268,010 B2
(45) Date of Patent: Feb. 23, 2016

(54) SURVEILLANCE SYSTEM AND METHOD (71) Applicant: HANWHA TECHWIN CO., LTD., Changwon-Si (KR)

(72) Inventor: Ki-Yong Jeon, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 45 days.

(21) Appl. No.: 13/650,291

(22) Filed: Oct. 12, 2012

(65) Prior Publication Data
US 2013/0093615 A1 Apr. 18, 2013

(30) Foreign Application Priority Data

Oct. 14, 2011 (KR) .................. 10-2011-0105536

(51) Int. Cl.
*G01S 13/08* (2006.01)
*G01S 13/87* (2006.01)
*G01S 13/00* (2006.01)
*G01S 7/40* (2006.01)
(Continued)

(52) U.S. Cl.
CPC .............. *G01S 7/4004* (2013.01); *G01S 13/003* (2013.01); *G01S 13/867* (2013.01); *G08B 13/19695* (2013.01)

(58) Field of Classification Search
CPC .... G08B 13/18; G08B 13/189; G08B 13/194; G08B 13/196; G08B 13/19695; G01S 7/02; G01S 7/40; G01S 7/4004; G01S 13/003; G01S 13/86; G01S 13/867; G01S 13/87; G01S 13/878; G01S 13/88; G01S 13/89; G01S 13/90; G01S 13/9035; G01S 2013/9058
USPC ........... 382/100, 103; 342/25 R–25 F, 27, 28, 342/52–55, 59, 118, 125–128, 133, 134, 342/139, 140, 165, 173–175, 195, 450–465, 342/169, 82, 89
See application file for complete search history.

(56) References Cited

U.S. PATENT DOCUMENTS 3,161,870 A * 12/1964 Pincoffs ...................... 342/59
3,289,205 A * 11/1966 Kampinsky ................. 342/169
3,487,462 A * 12/1969 Holberg ...................... 342/59
(Continued)

FOREIGN PATENT DOCUMENTS

CN 1068196 A 1/1993
CN 101330595 A 12/2008
CN 101860952 A 10/2010

OTHER PUBLICATIONS

M.I. Skolnik, "Introduction to Radar Systems"; second edition; McGraw-Hill Book Company; New York, NY, USA; 1980; ISBN 0-07-057909-1; pp. 553-557.*
(Continued)

*Primary Examiner* — Bernarr Gregory
(74) *Attorney, Agent, or Firm* — Sughrue Mion, PLLC (57) ABSTRACT

Provided is a surveillance system including a radar transmitter which transmits a detection signal to an object existing within a surveillance region, and at least one radar receiver which is installed separate from the radar transmitter within the surveillance region, receives a signal reflected by the object, and predicts a signal distance of the object which is a sum of a distance from the radar transmitter to the object and a distance from the object to the at least one radar receiver.

16 Claims, 10 Drawing Sheets

(51) Int. Cl.
*G01S 13/86* (2006.01)
*G08B 13/196* (2006.01)

(56) References Cited

U.S. PATENT DOCUMENTS

| | | | | |
|---|---|---|---|---|
| 3,568,198 | A * | 3/1971 | Borowitz et al. | 342/126 |
| 3,691,558 | A * | 9/1972 | Hoard et al. | 342/28 |
| 3,795,911 | A * | 3/1974 | Hammack | 342/463 |
| 3,812,493 | A * | 5/1974 | Afendykiw et al. | 342/453 |
| 3,815,131 | A * | 6/1974 | Dautel et al. | 342/28 |
| 3,889,266 | A * | 6/1975 | Bartram | 342/126 |
| 3,918,056 | A * | 11/1975 | Merrick | 342/125 |
| 3,943,514 | A * | 3/1976 | Afendykiw et al. | 342/453 |
| 3,953,856 | A * | 4/1976 | Hammack | 342/125 |
| 3,996,590 | A * | 12/1976 | Hammack | 342/126 |
| 4,051,472 | A * | 9/1977 | Albanese et al. | 342/28 |
| 4,319,243 | A | 3/1982 | Vachenauer et al. | |
| 4,370,656 | A * | 1/1983 | Frazier et al. | 342/126 |
| 4,595,924 | A | 6/1986 | Gehman | |
| 4,670,757 | A * | 6/1987 | Munich et al. | 342/453 |
| 5,113,193 | A * | 5/1992 | Powell et al. | 342/25 F |
| 5,302,955 | A * | 4/1994 | Schutte et al. | 342/59 |
| 5,327,145 | A * | 7/1994 | Jelinek | 342/453 |
| 5,381,156 | A * | 1/1995 | Bock et al. | 342/126 |
| 6,031,482 | A * | 2/2000 | Lemaitre et al. | 342/27 |
| 6,078,786 | A * | 6/2000 | Wandernoth et al. | 342/118 |
| 6,275,180 | B1 * | 8/2001 | Dean et al. | 342/195 |
| 6,295,019 | B1 * | 9/2001 | Richards et al. | 342/125 |
| 6,297,765 | B1 * | 10/2001 | Frazier et al. | 342/133 |
| 6,388,603 | B1 * | 5/2002 | Frazier et al. | 342/118 |
| 6,674,396 | B2 * | 1/2004 | Richards et al. | 342/125 |
| 6,954,404 | B2 * | 10/2005 | Herberthson | 342/59 |
| 7,193,556 | B1 * | 3/2007 | Pereira et al. | 342/175 |
| 7,205,930 | B2 * | 4/2007 | Ho et al. | 342/126 |
| 7,358,892 | B2 * | 4/2008 | Thome et al. | 342/174 |
| 7,518,543 | B2 * | 4/2009 | Herberthson | 342/59 |
| 7,752,483 | B1 | 7/2010 | Muresan et al. | |
| 8,120,526 | B2 * | 2/2012 | Holder | 342/140 |
| 8,718,323 | B2 * | 5/2014 | Kurien et al. | 382/103 |
| 2011/0215961 | A1 | 9/2011 | Moruzzis et al. | |

OTHER PUBLICATIONS

Chinese Office Action in corresponding Chinese Patent Application No. 201210385643.3, dated Dec. 24, 2015.

\* cited by examiner

SURVEILLANCE SYSTEM AND METHOD

CROSS-REFERENCE TO RELATED PATENT APPLICATION

This application claims priority from Korean Patent Application No. 10-2011-0105536, filed on Oct. 14, 2011, in the Korean Intellectual Property Office, the disclosure of which is incorporated herein in its entirety by reference.

BACKGROUND

1. Field

Apparatuses and method consistent with exemplary embodiments relate to a surveillance system and a surveillance method that use a radar sensor.

2. Description of the Related Art

Radar sensors detect and track an object that enters a surveillance region, and ascertain information about a location of the object, by using a radio frequency (RF) signal as a radar signal.

Figure 11:
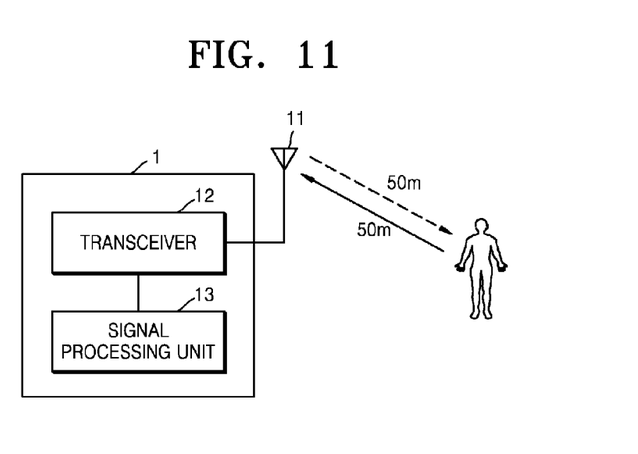
FIG. 11 is a schematic view of a related art radar sensor including a transceiver.

FIG. 11 is a schematic view of a related art radar sensor 1 including a transceiver 12. Referring to FIG. 11, the related art radar sensor 1 includes an antenna 11, the transceiver 12, and a signal processing unit 13. The transceiver 12 outputs a radar signal to an object via the antenna 11 and receives a signal reflected from an object. The radar signal transmitted to the object travels in a straight line to the object and is then reflected from the object to return to the transceiver 12. The signal processor 13 may ascertain a distance, a direction, and an altitude of the object by measuring a period of time during which a signal is transmitted, reflected, and returns to the transceiver 12, and may obtain information about the object via the distance, the direction, and the altitude of the object.

General civilian radar sensors restricted by local regulations have restrictions on an object detection range due to a limitation in an intensity of RF radiation power. In other words, in the related art radar sensor 1 using a transceiver, as illustrated in FIG. 11, for example, a radar sensor having a detection range of 50 m due to a limitation in RF radiation power, a wireless radar signal moves 50 m along a transmission path and 50 m along a reception path, and thus, an overall link budget corresponds to 100 m. Therefore, for example, an application having an object detection distance of 50 m or greater needs to use other radar sensors having larger detection ranges.

SUMMARY

One or more exemplary embodiments provide a radar transmitter, a radar receiver, a surveillance system including the radar transmitter and the radar receiver, and a surveillance method that use the surveillance system capable of increasing an object detection range.

According to an aspect of an exemplary embodiment, there is provided a radar receiver including: a signal receiving unit which receives a signal reflected from an object based on a detection signal transmitted from a radar transmitter, which is separately disposed from the radar receiver and the object in a surveillance zone; and a signal processor which, based on the reflected signal, estimates a signal distance of the object which is a sum of a distance from the radar transmitter to the object and a distance from the object to the radar receiver. The signal may be a radio frequency (RF) signal.

The radar receiver may further include a synchronizer which receives a synchronization signal from at least one of the radar transmitter and a server, and may control the radar receiver to synchronize with the at least one of the radar transmitter and the server using the synchronization signal, wherein the signal processor estimates the signal distance of the object further based on the synchronization signal.

The synchronization signal may be a specific single signal or a specific sequence of signals.

The synchronizer may transmit a synchronization request signal to the at least one of the radar transmitter and the server, and receive the synchronization signal in response to the synchronization request signal.

The synchronization request signal may include a first time stamp indicating a time when the synchronizer transmits the synchronization request signal to the at least one of the radar transmitter and the server, and the synchronization signal may include a second time stamp indicating a time when the at least one of the radar transmitter and the server transmits the synchronization signal to the synchronizer of the radar receiver, and the synchronizer may calculate an error value by using the synchronization signal and control the radar receiver to synchronize with the at least one of the radar transmitter and the server.

The second time stamp may further indicate a time when the at least one of the radar transmitter and the server receives the synchronization request signal, and the synchronizer may calculate the error value by further using a time when the synchronizer receives the synchronization signal.

If the synchronization signal is received from the transmitter, the synchronization signal may include an identification code which identifies the radar transmitter from another radar transmitter and the server.

The signal receiving unit of the radar receiver may further receive the detection signal transmitted from the transmitter, and estimate the signal distance based on the reflected signal and the detection signal.

According to an aspect of another exemplary embodiment, there is provided a radar transmitter including: a signal transmitting unit which transmits a detection signal to an object which exists in a surveillance zone; and a synchronizer which performs synchronization with a radar receiver which exists in the surveillance zone separately from the radar transmitter and receives a signal reflected from the object based on the detection signal, wherein the radar receiver estimates a signal distance of the object which is a sum of a distance between the radar transmitter and the object and a distance between the object and the radar receiver based on the reflected signal.

The synchronizer of the radar transmitter may transmit a synchronization signal to the radar receiver to perform the synchronization with the radar receiver or receive a synchronization signal from a server installed outside the radar transmitter to perform the synchronization with the radar receiver.

According to an aspect of another exemplary embodiment, there is provided a surveillance system including the radar transmitter and the radar receiver described above.

The radar transmitter may include: a signal transmitting unit which transmits the detection signal to the object; and a synchronizer which transmits a synchronization signal to the radar receiver, which exists in the surveillance zone separately from the radar transmitter and receives the reflected signal, to synchronize with the radar receiver.

The synchronization signal may be a specific single signal or a specific sequence of signals.

The radar receiver may estimate the signal distance of the object further based on the detection signal and the synchronization signal.

The surveillance system may further include a video processing device which receives the signal distance from the radar receiver to detect a location of the object, and generates a control signal for controlling a camera to be directed toward the object, to control a photographing direction of the camera.

According to an aspect of an exemplary embodiment, there is provided a surveillance method including: receiving, at a radar receiver, a signal reflected from an object based on a detection signal transmitted from a transmitter, which is separately disposed from the radar receiver and the object in a surveillance zone; and estimating a signal distance of the object which is a sum of a distance from the radar transmitter to the object and a distance from the object to the radar receiver, based on the reflected signal.

The method may further include: receiving at the radar receiver a synchronization signal from at least one of the radar transmitter and a server; and controlling the radar receiver to synchronize with the at least one of the radar transmitter and the server using the synchronization signal, wherein the signal distance of the object is estimated further based on the synchronization signal.

The method may further include transmitting a synchronization request signal from the radar receiver to the at least one of the radar transmitter and the server, wherein the synchronization signal is received in response to the synchronization request signal.

The synchronization request signal may include a first time stamp indicating a time when the radar receiver transmits the synchronization request signal to the at least one of the radar transmitter and the server. The synchronization signal may include a second time stamp indicating a time when the at least one of the radar transmitter and the server transmits the synchronization signal to the radar receiver. The controlling the radar receiver to synchronize may be performed by calculating an error value by using the synchronization signal.

The second time stamp may further indicate a time when the at least one of the radar transmitter and the server receives the synchronization request signal, and the calculating the error value may be performed further using a time when the radar receiver receives the synchronization signal.

According to the exemplary embodiments, an object detection range may be increased by the surveillance system separately including the radar transmitter and the radar receiver. Moreover, the accuracy of object detection may be increased by periodical synchronization.

BRIEF DESCRIPTION OF THE DRAWINGS

The above and other aspects will become more apparent by describing in detail exemplary embodiments with reference to the attached drawings, in which.

DETAILED DESCRIPTION

Hereinafter, exemplary embodiments will be described more fully with reference to the accompanying drawings Like numbers refer to like elements throughout. In the description of the exemplary embodiments, if it is determined that a detailed description of commonly-used technologies or structures related to the inventive concept may unnecessarily obscure the subject matter of the exemplary embodiments, the detailed description will be omitted.

It will be understood that, although the terms 'first', 'second', 'third', etc., may be used herein to describe various elements, these elements should not be limited by these terms. These terms are only used to distinguish one element from another element. For example, a first element discussed below could be termed a second element, and similarly, a second element may be termed a first element without departing from the teachings of this disclosure. Moreover, a series of processes according to the exemplary embodiments include not only sequentially performed processes but also processes performed individually or in parallel.

Figure 1:
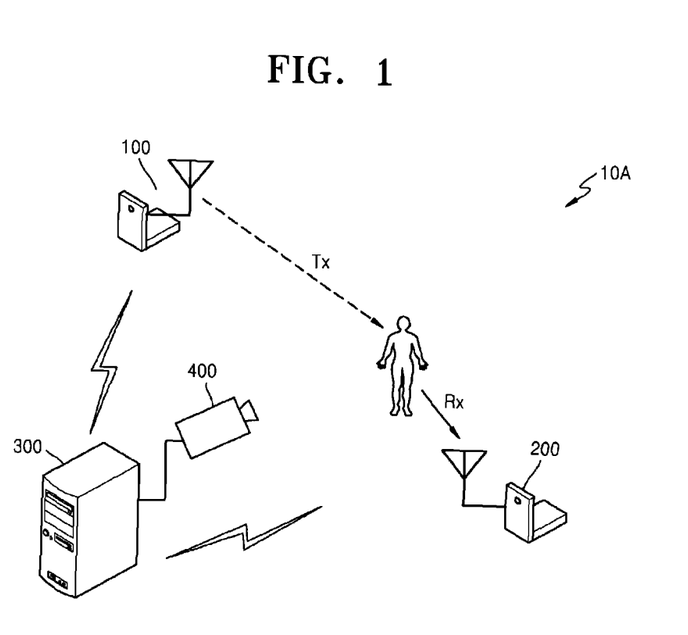
FIG. 1 illustrates a radar-based surveillance system according to an exemplary embodiment.

FIG. 1 illustrates a radar-based surveillance system 10A according to an exemplary embodiment.

Referring to FIG. 1, the radar-based surveillance system 10A includes a radar sensor including a radar transmitter 100 and a radar receiver 200, and a video processing device 300.

The radar sensor detects and tracks an object that enters a surveillance region, and detects a location of the object, by using a radio frequency (RF) signal as a radar signal. In the radar sensor according to the present embodiment, the radar transmitter 100 and the radar receiver 200 are installed separate from each other within the surveillance region.

A related art radar sensor including a transceiver has a limitation in an object detection range because it detects an object by using a signal returning by being reflected from the object. On the other hand, a radar sensor according to the present embodiment may increase an object detection range by using a transmission path and a reception path for the radar signal independently. For example, compared to a related art transceiver-based radar sensor having a detection range of 50 m, radar sensors according to exemplary embodiments may include a radar transmitter and a radar receiver spaced by a distance of 100 m and may detect an object existing in the distance of 100 m therebetween to estimate a distance of an object. Accordingly, the object detection range may be increased to 100 m.

The radar transmitter 100 periodically outputs a radar signal.

The radar receiver 200 receives an output radar signal Tx of the radar transmitter 100 and a reflected radar signal Rx obtained by reflection of the output radar signal Tx from the object. The radar receiver 200 may analyze the output radar signal Tx and the reflected radar signal Rx to detect a length of an entire path along which the radar signal is transmitted by the radar transmitter 100, reflected by the object, and received by the radar receiver 200 (hereinafter, referred to as a signal distance of an object).

At this time, the radar transmitter 100 and the radar receiver 200 may be synchronized with each other by a synchronization signal.

The radar receiver 200 transmits the signal distance of the object to the video processing device 300.

The video processing device 300 is connected to a camera 400 in a wired/wireless manner, receives the signal distance of the object from the radar receiver 200, and calculates the location of the detected object in cooperation with the radar receiver 200.

The video processing device 300 estimates the location of the object based on the signal distance of the object and directs the camera 400 toward the object to monitor the object.

Figure 2:
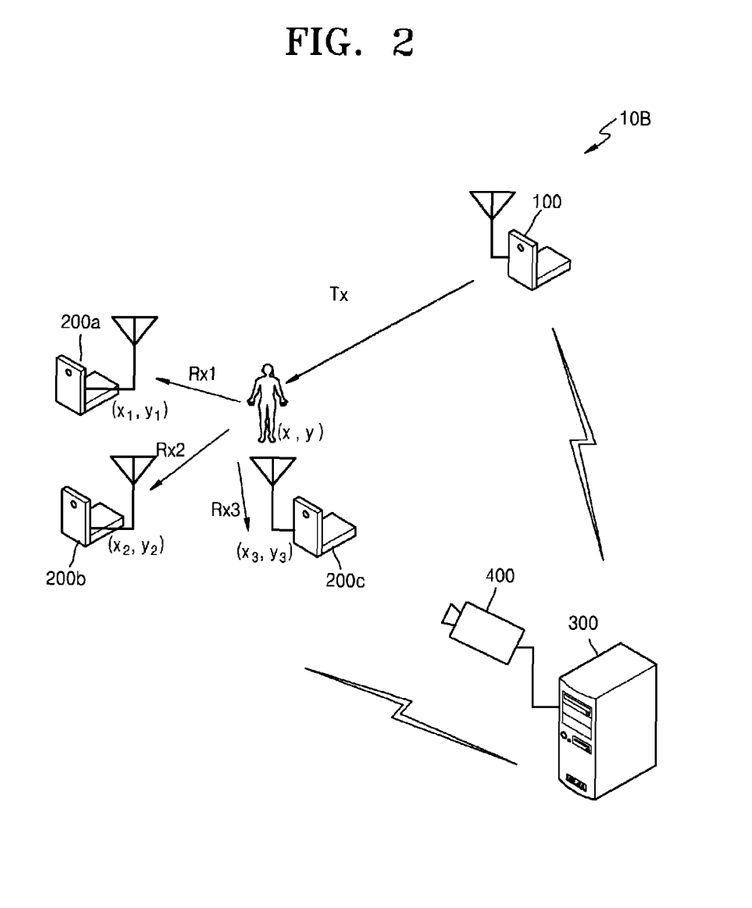
FIG. 2 illustrates a radar-based surveillance system according to another exemplary embodiment.

FIG. 2 illustrates a radar-based surveillance system 10B according to another exemplary embodiment.

Referring to FIG. 2, the radar-based surveillance system 10B includes a radar sensor including the radar transmitter 100 and a plurality of radar receivers 200a, 200b, and 200c, and the video processing device 300. The embodiment of FIG. 2 is the same as that of FIG. 1 except for the radar receivers 200a, 200b, and 200c.

The video processing device 300 may detect information about a location of an object based on at least three signal distances of an object and estimate the location of the object. Accordingly, the three radar receivers 200a, 200b, and 200c are illustrated in the present embodiment.

As in the radar sensor of FIG. 1, in the radar sensor according to the present embodiment, the radar transmitter 100 and the radar receivers 200a, 200b, and 200c are installed separate from each other within a surveillance region. Accordingly, like the radar sensor of FIG. 1, the radar sensor of FIG. 2 may also increase an object detection range, compared to related art radar sensors including a transceiver.

The radar transmitter 100 periodically outputs a radar signal.

The radar receivers 200a, 200b, and 200c receive an output radar signal Tx of the radar transmitter 100 and reflected radar signals Rx1, Rx2, and Rx3 obtained by reflection of the output radar signal Tx from the object, respectively.

The radar receivers 200a, 200b, and 200c are spaced apart from one another. The radar receivers 200a, 200b, and 200c may analyze the output radar signal Tx and the reflected radar signals Rx1, Rx2, and Rx3, respectively, to detect the signal distance of the object, namely, a length of an entire path along which a radar signal is transmitted by the radar transmitter 100, reflected by the object, and received at respective locations (x1,y1), (x2,y2), and (x3,y3) of the radar receivers 200a, 200b, and 200c.

At this time, the radar transmitter 100 and the radar receivers 200a, 200b, and 200c may be synchronized with one another by a synchronization signal.

The radar receivers 200a, 200b, and 200c transmit three signal distances of the object to the video processing device 300.

Although a single radar transmitter 100 and three radar receivers 200a, 200b, and 200c are illustrated in FIG. 2, a number of the radar sensors is not limited thereto, and it may include at least one radar transmitter and at least one radar receiver arranged within a surveillance region.

The video processing device 300 is connected to the camera 400 in a wired/wireless manner, receives the signal distances of the object from the radar receivers 200a, 200b, and 200c, and monitors the detected object in cooperation with the radar receivers 200a, 200b, and 200c.

The video processing device 300 estimates the location of the object based on the signal distances of the object and directs the camera 400 toward the object to monitor the object.

Figure 3:
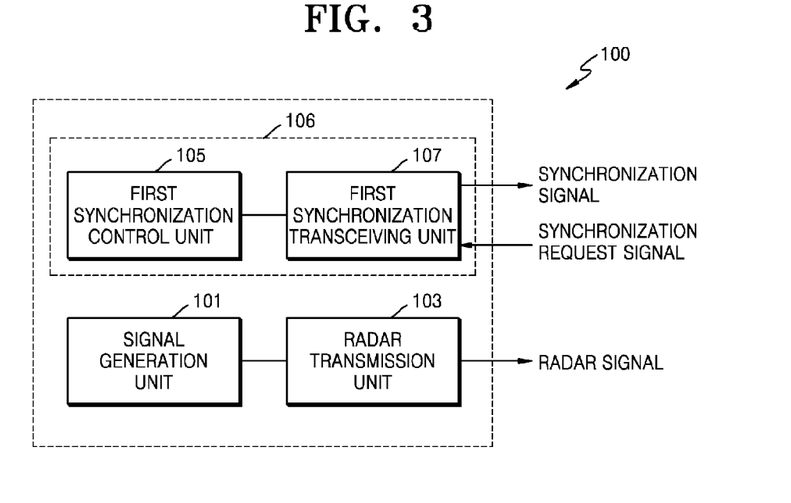
FIG. 3 is a schematic block diagram of an internal structure of a radar transmitter according to an exemplary embodiment.

FIG. 3 is a schematic block diagram of an internal structure of the radar transmitter 100, according to an exemplary embodiment.

Referring to FIG. 3, the radar transmitter 100 may include a signal generation unit 101, a radar transmission unit 103, a first synchronization control unit 105, and a first synchronization transceiving unit 107. The first synchronization control unit 105 and the first synchronization transceiving unit 107 may be collectively constituted as a synchronizer 106.

The signal generation unit 101 generates a radar signal to be transmitted. The radar signal is an RF signal which may have a predetermined frequency, and may be converted into a pulse-type radar signal.

The radar transmission unit 103 may output the pulse-type radar signal to a surveillance region via an antenna. The radar transmission unit 105 may periodically output the radar signal to the surveillance region while the radar transmitter 100 is fixed or rotates within a predetermined range.

The first synchronization control unit 105 synchronizes with the radar receiver 200 shown in FIG. 1 or the three radar receivers 200a, 200b, and 200c shown in FIG. 2, which are arranged apart from the radar transmitter 100. The first synchronization control unit 105 may be synchronized with the radar receiver 200 or the three radar receivers 200a, 200b, and 200c directly or via a server.

When receiving a synchronization request signal from the radar receiver 200 or the three radar receivers 200a, 200b, and 200c via the first synchronization transceiving unit 107, the first synchronization control unit 105 may generate a synchronization signal and transmit the same to the radar receiver 200 or the three radar receivers 200a, 200b, and 200c via the first synchronization transceiving unit 107. Alternatively, the first synchronization control unit 105 may transmit a synchronization request signal to a server via the first synchronization transceiving unit 107 and receive a synchronization signal from the server so as to be synchronized with the server, thereby synchronizing with the radar receiver 200 or the three radar receivers 200a, 200b, and 200c. The synchronization request signal and the synchronization signal may be transmitted and received along a wired/wireless network path different from transmission and reception paths for the radar signal.

The first synchronization transceiving unit 107 may include an identification code of the radar transmitter 100 in the synchronization signal.

The synchronization signal is a signal pre-arranged between the radar transmitter 100 and either the radar receiver 200 or the three radar receivers 200a, 200b, and 200c, and may be defined as a specific single signal or a specific sequence of signals. The synchronization signal may be generated periodically or non-periodically. The synchronization request signal and the synchronization signal include time information.

In addition, the first synchronization control unit 105 may periodically generate an initialization signal including an absolute time of the radar transmitter 100 itself, and the first synchronization transceiving unit 107 may transmit the initialization signal to the radar receiver 200 or the three radar receivers 200a, 200b, and 200c. Alternatively, the first synchronization control unit 105 may periodically receive an initialization signal including an absolute time of a server from the server via the first synchronization transceiving unit 107 and may perform time initialization.

Figure 4:
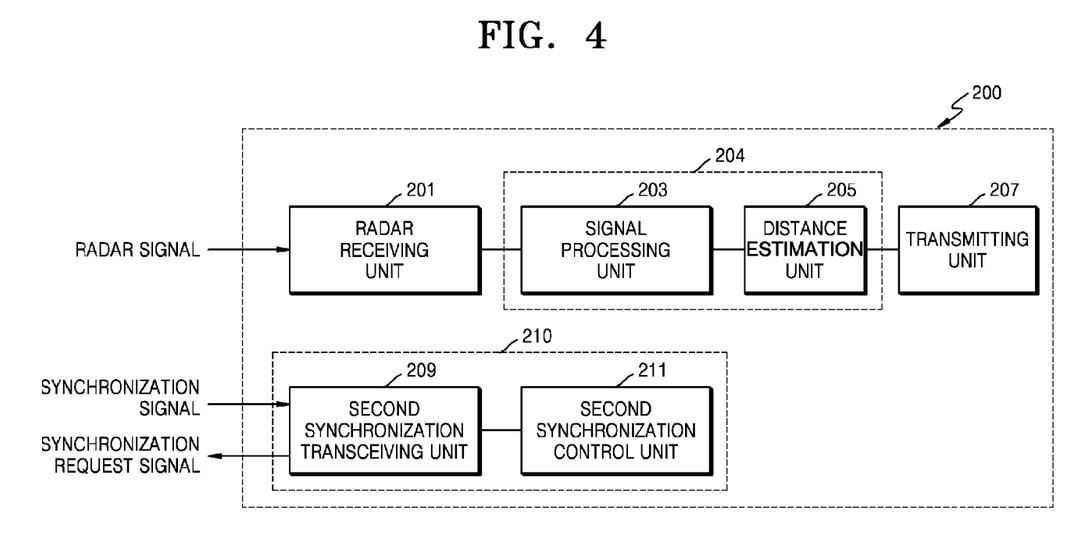
FIG. 4 is a schematic block diagram of an internal structure of a radar receiver according to an exemplary embodiment.

FIG. 4 is a schematic block diagram of an internal structure of a radar receiver 200 according to an exemplary embodiment. The radar receiver 200 of FIG. 4 may be each of the radar receivers 200, 200a, 200b, and 200c, and the radar receiver 200 of FIG. 1 will now be described as an example.

Referring to FIG. 4, the radar receiver 200 may include a radar receiving unit 201, a signal processing unit 203, a distance estimation unit 205, a transmitting unit 207, a second synchronization transceiving unit 209, and a second synchronization control unit 211. The signal processing unit 203 and the distance estimating unit 205 may be collectively constituted as a signal processor 204. The second synchronization transceiving unit 209 and the second synchronization control unit 211 may be collectively constituted as a synchronizer 210.

The radar receiving unit 201 receives a radar signal from the radar transmitter 100 via an antenna and receives a radar signal reflected from the object.

The signal processing unit 203 removes clutter and noise from the received radar signal. For example, the signal processing unit 203 may remove clutter and noise by using a loop-filter algorithm, a singular value decomposition (SVD) algorithm, or the like. However, various other methods may be used to remove clutter and noise.

The distance estimation unit 205 may estimate a signal distance of the object based on the radar signal output by the radar transmitter 100 and the radar signal reflected by the object. The distance estimation unit 205 may measure a time difference between the radar signal output by the radar transmitter 100 and the radar signal reflected by the object by using a cross correlation function, and may estimate the distance of the object based on the time difference.

The transmitting unit 207 may transmit information about the estimated distance of the object to the video processing device 300 in a wired/wireless manner.

The second synchronization control unit 211 may generate a synchronization request signal to synchronize with the radar transmitter 100, and transmit the same to the radar transmitter 100 via the second synchronization transceiving unit 209. The second synchronization control unit 211 may receive a synchronization signal from the radar transmitter 100 via the second synchronization transceiving unit 209, and may synchronize with the radar transmitter 100 and other neighboring radar receivers according to the synchronization signal. Alternatively, the second synchronization control unit 211 may transmit a synchronization request signal to a server via the second synchronization transceiving unit 209 and receive a synchronization signal from the server so as to be synchronized with the server, thereby synchronizing with the radar transmitter 100 and other neighboring radar receivers. The synchronization request signal and the synchronization signal may be transmitted and received via a wired/wireless network path different from transmission and reception paths for the radar signal. The synchronization request signal and the synchronization signal include time information.

The second synchronization control unit 211 may extract an identification code from the synchronization signal, and may ascertain which one of a plurality of radar transmitters 100 has transmitted the synchronization signal, based on the identification code.

The second synchronization transceiving unit 209 may periodically receive an initialization signal including an absolute time of the radar transmitter 100 or an absolute time of the server from the radar transmitter 100 or the server, respectively, and the second synchronization control unit 211 may periodically initialize its own time.

Figure 5:
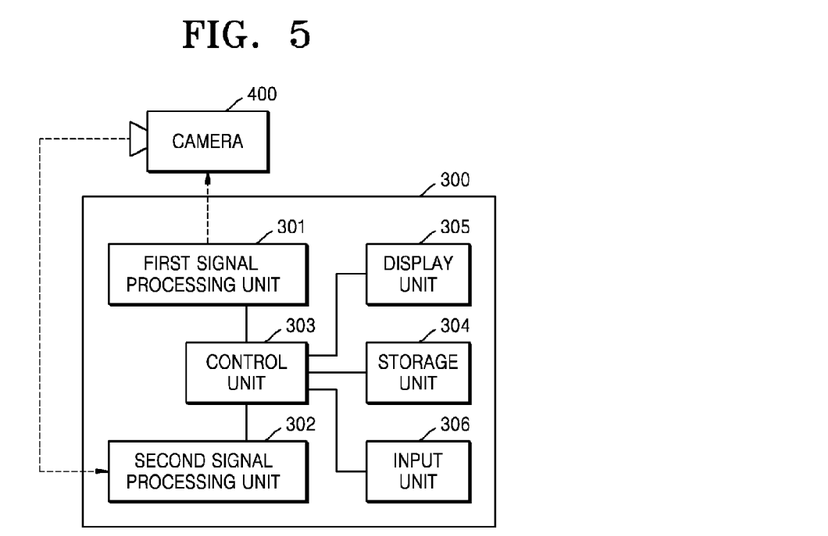
FIG. 5 is a schematic block diagram of an internal structure of a video processing device according to an exemplary embodiment.

FIG. 5 is a schematic block diagram of an internal structure of the video processing device 300, according to an exemplary embodiment.

Referring to FIG. 5, the video processing device 300 is connected to any of various types of cameras, such as a pan-tilt-zoom (PTZ) camera 400, by wires or wirelessly. Examples of the video processing device 300 may include a digital video recorder (DVR) and/or a network video recorder (NVR), which are widely used as a closed-circuit TV (CCTV) system, and also a personal computer (PC) or a server for storing data under a cloud computing environment and a mobile device.

The video processing device 300 may include a first signal processing unit 301, a second signal processing unit 302, a control unit 303, a storage unit 304, a display unit 305, and an input unit 306.

The first signal processing unit 301 receives information about a signal distance of an object from a radar sensor 100. The first signal processing unit 301 may receive signal distances of the object from a plurality of radar receivers 200. For example, referring to FIGS. 2 and 5, the first signal processing unit 301 may detect information about a location of the object based on respective signal distances of the object received from at least three radar receivers, namely, the radar receives 200a, 200b, and 200c, and estimate the location of the object. The information about the location of the object includes a distance, a direction, and an altitude of the object.

At this time, the radar transmitter 100 and the radar receivers 200a, 200b, and 200c may be synchronized with one another by a synchronization signal. Accordingly, the first signal processing unit 301 may accurately detect the location of the object by using respective signal distances of the object that the radar receivers 200a, 200b, and 200 have estimated based on the reflected radar signal Rx obtained by the object reflecting the output radar signal Tx.

The first signal processing unit 301 may generate a camera control signal that controls the camera 400 to be directed toward the detected object, based on the information about the location of the object, and may output the camera control signal to the camera 400. The camera control signal includes a panning value and a tilting value used to rotate the camera 400 in horizontal and vertical directions, respectively, and a zooming value representing an image magnification rate, and thus, may set a photographing direction of the camera 400 and the focus thereof.

Although the first signal processing unit 301 generates and provides the camera control signal to the camera 400 in the present embodiment, the first signal processing unit 301 may provide the information about the location of the object to the camera 400 so that the camera 400 generates a camera control signal based on the information about the location of the object and sets a photographing direction of the camera 400 and the focus thereof.

The second signal processing unit 302 receives an image captured by the camera 400 directed toward the detected object, and processes the image according to a pre-set algorithm.

The control unit 303 controls each component of the video processing device 300. When the first signal processing unit 302 receives the signal distance of the object from the radar sensor 100, the control unit 303 may control the video processing device 300 to be activated in a standby mode and to be converted from the standby mode to a surveillance mode.

The storage unit 304 stores an image output by the second signal processing unit 302. The control unit 303 may set a field for storing time information and a field for storing the information about the location of the object, in the storage unit 304. Accordingly, the storage unit 304 may store the time information and the information about the location of the object, together with the image. The storage unit 304 may be a magnetic disk, a memory card, an optical disk, or the like that may be built or installed in the video processing device 300.

The display unit 305 displays the image output by the second signal processing unit 302 or menu items or the like produced according to a control signal received via the input unit 306. When a user requests an image search via the input unit 305, the display unit 305 may display menu items or the like that allows the user to directly or indirectly select a type and location of an object, a specific time, and the like. The display unit 305 may provide visual information and/or auditory information to the user, and the display unit 305 may be a liquid crystal display (LCD) panel, an organic light-emitting display panel (OLED), an electrophoretic display (EPD), or the like. The display unit 205 may take a form of a touch screen to receive user input via touching, and may operate as a user interface.

The input unit 306 may be implemented by using hardware or software. When the input unit 306 is implemented by using hardware, it may receive a signal via a wired/wireless remote controller or via a menu button integrated into the display unit 305. When the input unit 306 is implemented by using software, it may be displayed on the screen of the display unit 305 and may receive signals via a pointing device, such as a mouse, a keyboard, or a track ball, or via touch screen sensitivity, such as a finger, a pen, or a stylus system.

Figure 6:
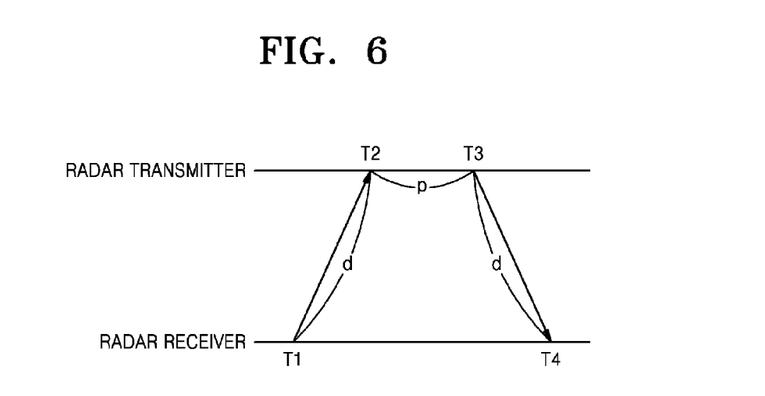
FIGS. 6 and 7 are views for schematically explaining synchronization between a radar transmitter and a radar receiver, according to an exemplary embodiment.
Figure 7:
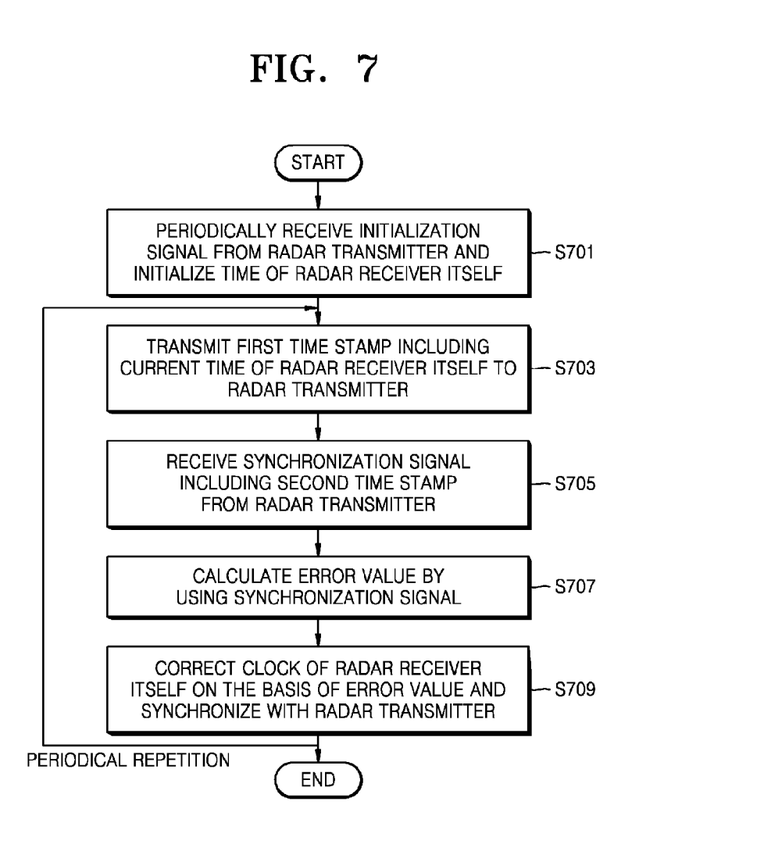

FIGS. 6 and 7 are views for schematically explaining synchronization between a radar transmitter and a radar receiver, according to an exemplary embodiment.

Referring to FIGS. 6 and 7, first, the radar receiver periodically receives an initialization signal from the radar transmitter and initializes a time of the radar receiver itself, in operation S701. The radar transmitter, periodically, for example, once a day, transmits an initialization signal including an absolute time of the radar transmitter to the radar receiver.

In operation S703, the time-initialized radar receiver transmits a first time stamp as a synchronization request signal to the radar transmitter. The first time stamp is a current time of the radar receiver, and includes a first time T1 when the radar receiver transmits the first time stamp to the radar transmitter.

In operation S705, the radar receiver receives a synchronization signal including a second time stamp, from the radar transmitter. The radar transmitter generates the second time stamp based on the first time stamp, and transmits the second time stamp to the radar receiver. The second time stamp includes the first time T1, a second time T2 when the radar transmitter receives the first time stamp from the radar receiver, and a third time T3 when the radar transmitter transmits the second time stamp to the radar receiver.

In operation S707, the radar receiver calculates an error value $\Delta$ by using the synchronization signal. The radar receiver may calculate the error value $\Delta$ by using a round trip time (RTT) from the first time T1 when the radar receiver transmits the first time stamp to the radar transmitter to a fourth time T4 when the radar receiver receives the synchronization signal including the second time stamp from the radar transmitter. The error value $\Delta$ is a clock difference between a radar transmitter RTx and a radar receiver RRx. The error value $\Delta$ may be calculated using Equations (1) through (5):

$$T_1^{RRx} + \Delta + d = T_2^{RTx} \quad (1)$$

$$p + 2d = T_4^{RRx} - T_1^{RRx} \quad (2)$$

$$p = T_3^{RTx} - T_2^{RTx} \quad (3)$$

$$d = \frac{T_4^{RRx} - T_1^{RRx} - (T_3^{RTx} - T_2^{RTx})}{2} \quad (4)$$

$$\Delta = T_2^{RTx} - T_1^{RRx} - \frac{T_4^{RRx} - T_1^{RRx} - (T_3^{RTx} - T_2^{RTx})}{2} \quad (5)$$

where d denotes a time period required for the radar receiver to transmit the first time stamp to the radar transmitter and a time period required for the radar transmitter to transmit the second time stamp to the radar receiver, and p denotes a time period required for the radar transmitter to receive the first time stamp and transmit the second time stamp.

In other words, the error value $\Delta$ may be calculated by using the first time T1 when the radar receiver transmits the first time stamp to the radar transmitter, the second time T2 when the radar transmitter receives the first time stamp from the radar receiver, the third time T3 when the radar transmitter transmits the second time stamp to the radar receiver, and the fourth time T4 when the radar receiver receives the second time stamp from the radar transmitter.

In operation S709, the radar receiver corrects its own clock based on the error value $\Delta$ and synchronizes with the radar transmitter.

The radar receiver may repeat operations S703 through S709 periodically, for example, every hour, to be synchronized with the radar transmitter.

Figure 8A:
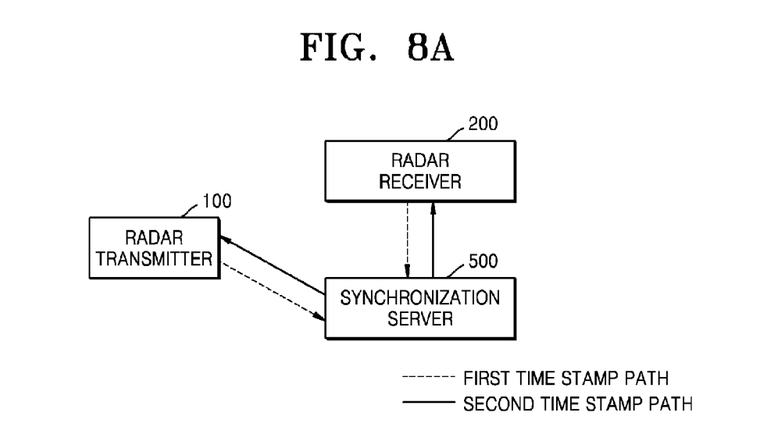
FIGS. 8A and 8B are block diagrams of a network system for synchronization between a radar transmitter and a radar receiver according to exemplary embodiments.
Figure 8B:
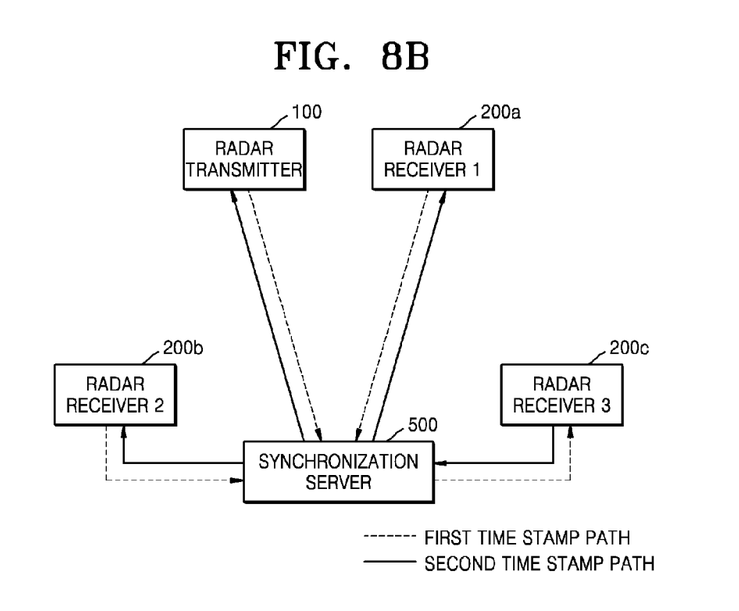
Figure 9:
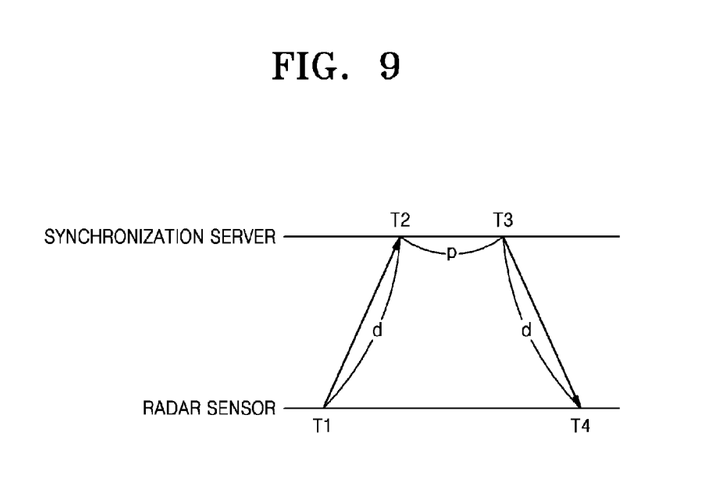
FIGS. 9 and 10 are views for schematically explaining the synchronization between a radar transmitter and a radar receiver performed by the network system of FIGS. 8A and 8B, according to exemplary embodiments.
Figure 10:
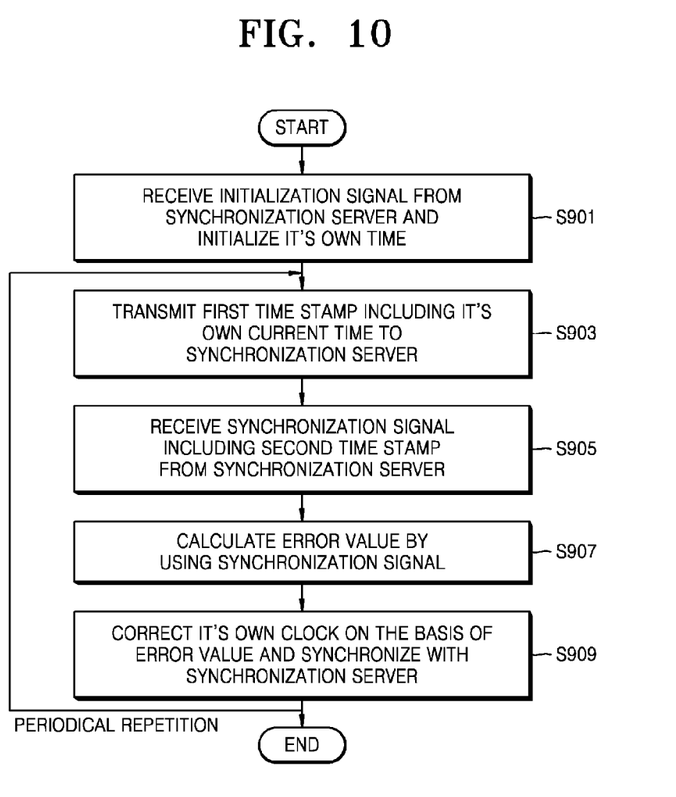

FIGS. 8A and 8B are block diagrams of a network system for synchronization between a radar transmitter and a radar receiver according to another exemplary embodiment. FIGS. 9 and 10 are views for schematically explaining the synchronization between the radar transmitter and the radar receiver performed by the network system of FIGS. 8A and 8B.

In the network system of FIGS. 8A and 8B, synchronization between the radar transmitter 100 and either the single radar receiver 200 or a plurality of radar receivers, namely, the radar receivers 200a, 200b, and 200c, is performed via a synchronization server 500. The synchronization server 500 may include a management module for managing the radar transmitter 100 and either the radar receiver 200 or the radar receivers 200a, 200b, and 200c, and a synchronization module for synchronization.

Referring to FIGS. 9 and 10, first, the radar transmitter 100 and either the radar receiver 200 or the radar receivers 200a, 200b, and 200c periodically receive an initialization signal from the synchronization server 500 and initialize their own time, in operation S901. The synchronization server 500 periodically, for example, once a day, transmits an initialization signal including its own absolute time to the radar transmitter 100 and either the radar receiver 200 or the radar receivers 200a, 200b, and 200c. A radar sensor of FIGS. 8A and 8B may be the radar transmitter 100 or each of the radar receivers 200, 200a, 200b, and 200c. The radar transmitter 100 or each of the radar receivers 200, 200a, 200b, and 200c will now be referred to as a radar sensor.

In operation S903, a time-initialized radar sensor transmits a first time stamp as a synchronization request signal to the synchronization server 500. The first time stamp is a current time of the radar sensor, and includes a first time T1 when the radar sensor transmits the first time stamp to the synchronization server 500.

In operation S905, the radar sensor receives a synchronization signal, including a second time stamp, from the synchronization server 500. The synchronization server 500 generates the second time stamp based on the first time stamp, and transmits the second time stamp to the radar sensor. The second time stamp includes the first time T1, a second time T2 when the synchronization server 500 receives the first time stamp from the radar sensor, and a third time T3 when the synchronization server 500 transmits the second time stamp to the radar sensor.

In operation S907, the radar sensor calculates an error value Δ by using the synchronization signal. The radar sensor may calculate the error value Δ by using an RTT from the first time T1 when the radar sensor transmits the first time stamp to the synchronization server 500 to a fourth time T4 when the radar sensor receives the synchronization signal, including the second time stamp, from the synchronization server 500. The error value Δ is a clock difference between the synchronization server 500 (i.e., Sv) and the radar sensor (i.e., Rs). The error value Δ may be calculated using Equations (6) through (10):

$$T_1^{Rs} + \Delta + d = T_2^{Sv} \quad (6)$$

$$p + 2d = T_4^{Rs} - T_1^{Rs} \quad (7)$$

$$p = T_3^{Sv} - T_2^{Sv} \quad (8)$$

$$d = \frac{T_4^{Rs} - T_1^{Rs} - (T_3^{Sv} - T_2^{Sv})}{2} \quad (9)$$

$$\Delta = T_2^{Sv} - T_1^{Rs} - \frac{T_4^{Rs} - T_1^{Rs} - (T_3^{Sv} - T_2^{Sv})}{2} \quad (10)$$

where d denotes a time period required for the radar sensor to transmit the first time stamp to the synchronization server 500 and a time period required for the synchronization server 500 to transmit the second time stamp to the radar sensor, and p denotes a time period required for the synchronization server 500 to receive the first time stamp and transmit the second time stamp.

In other words, the error value Δ may be calculated by using the first time T1 when the radar sensor transmits the first time stamp to the synchronization server 500, the second time T2 when the synchronization server 500 receives the first time stamp from the radar sensor, the third time T3 when the synchronization server 500 transmits the second time stamp to the radar sensor, and the fourth time T4 when the radar sensor receives the second time stamp from the synchronization server 500.

In operation S909, the radar sensor corrects its own clock based on the error value Δ and synchronizes with the synchronization server 500.

The radar sensor may repeat operations S903 through S909 periodically, for example, every hour, to be synchronized with the synchronization server 500.

Although the synchronization server 500 is independently included in the present exemplary embodiment, the network system of FIGS. 8A and 8B is not limited thereto. The synchronization server 500 may be integrated into the video processing device 300 of FIG. 1 or the radar transmitter 100.

According to the exemplary embodiments, separate installation of a radar transmitter and a radar receiver may increase a recognition distance of an object to be detected. In addition, an installation of a single radar transmitter and a plurality of radar receivers may lead to accurate detection of a location of an object within an increased distance. According to the exemplary embodiments, a radar transmitter and a radar receiver synchronize with each other by transmitting and receiving a pre-defined signal therebetween, thereby removing a drift of a clock. According to the exemplary embodiments, a radar sensor includes a radar transmitter and a radar receiver independently, thus reducing an overall system cost compared to radar sensors including an integrated transceiver. In the meantime, the inventive concept is not limited to the exemplary embodiments as described above employing radar signals, a radar transmitter and a radar receiver. That is, the inventive concept may apply to different types of a signal and corresponding transmitter and receivers.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A radar receiving apparatus comprising:
a signal receiving unit configured to receive an output radar signal transmitted from a radar transmitter and a signal reflected from an object, the reflected signal obtained by reflection of the output radar signal transmitted from the radar transmitter, which is separately disposed from the radar receiving apparatus and the object in a surveillance zone;
a signal processor configured to estimate, based on the reflected signal and the output radar signal, a signal distance of the object which is a sum of a distance from the radar transmitter to the object and a distance from the object to the radar receiving apparatus; and
a synchronizer which transmits a synchronization request signal to at least one of the radar transmitter and a server and receives a synchronization signal from the at least one of the radar transmitter and the server in response to the synchronization request signal, and controls the radar receiving apparatus to synchronize with the at least one of the radar transmitter and the server using the synchronization signal,
wherein the synchronization request signal comprises a first time stamp indicating a time when the synchronizer transmits the synchronization request signal to the at least one of the radar transmitter and the server,
wherein the synchronization signal comprises a second time stamp indicating a time when the at least one of the radar transmitter and the server transmits the synchronization signal to the synchronizer of the radar receiving apparatus, and
wherein the synchronizer calculates an error value by using the synchronization signal and controls the radar receiving apparatus to synchronize with the at least one of the radar transmitter and the server.

2. The radar receiving apparatus of claim 1, wherein the second time stamp further indicates a time when the at least one of the radar transmitter and the server receives the synchronization request signal, and
wherein the synchronizer calculates the error value by further using a time when the synchronizer receives the synchronization signal.

3. The radar receiving apparatus of claim 1, wherein if the synchronization signal is received from the radar transmitter, the synchronization signal comprises an identification code which identifies the radar transmitter from another radar transmitter and the server.

4. The radar receiving apparatus of claim 1,
wherein the signal processor estimates the signal distance of the object further based on the synchronization signal.

5. A radar transmitting apparatus comprising:
a signal transmitting unit configured to transmit an output radar signal to an object which exists in a surveillance zone; and a synchronizer configured to perform synchronization with a radar receiver which exists in the surveillance zone separately from the radar transmitting apparatus, wherein the radar receiver estimates a signal distance of the object which is a sum of a distance between the radar transmitting apparatus and the object and a distance between the object and the radar receiver based on the output radar signal and a signal reflected from the object, the reflected signal obtained by reflection of the output radar signal, wherein the synchronizer of the radar transmitting apparatus is configured to transmit a synchronization signal to the radar receiver to perform the synchronization with the radar receiver or is configured to receive a synchronization signal from a server installed outside the radar transmitting apparatus to perform the synchronization with the radar receiver.

6. The radar transmitting apparatus of claim 5, wherein the radar receiver estimates the signal distance further based on the synchronization signal.

7. The radar transmitting apparatus of claim 5, wherein the synchronization signal comprises an identification code which identifies the radar transmitter from another radar transmitter and the server.

8. The radar transmitting apparatus of claim 5, wherein the synchronizer which transmits a synchronization request signal to the server and receives a synchronization signal from the server in response to the synchronization request signal, and controls the radar transmitting apparatus to synchronize with the radar receiver using the synchronization signal, wherein the synchronization request signal comprises a first time stamp indicating a time when the synchronizer transmits the synchronization request signal to the server, and wherein the synchronization signal comprises a second time stamp indicating a time when the server transmits the synchronization signal to the synchronizer of the radar transmitting apparatus, and wherein the synchronizer calculates an error value by using the synchronization signal and controls the radar transmitting apparatus to synchronize with the radar receiver.

9. A surveillance system comprising:
a radar transmitting apparatus;
a radar receiving apparatus comprising:
 a signal receiving unit configured to receive a signal reflected from an object, the reflected signal obtained by reflection of an output radar signal transmitted from the radar transmitting apparatus, which is separately disposed from the radar receiving apparatus and the object in a surveillance zone; and
 a signal processor configured to estimate, based on the output radar signal and the reflected signal, a signal distance of the object which is a sum of a distance from the radar transmitting apparatus to the object and a distance from the object to the radar receiving apparatus; and
a video processing device configured to receive the signal distance from the radar receiving apparatus to detect a location of the object, and generate a control signal for controlling a camera to be directed toward the object, to control a photographing direction of the camera.

10. The surveillance system of claim 9, wherein the radar transmitting apparatus comprises:
a signal transmitting unit configured to transmit the output radar signal to the object; and
a synchronizer configured to transmit a synchronization signal to the radar receiving apparatus, which exists in the surveillance zone separately from the radar transmitting apparatus and receives the reflected signal, to synchronize with the radar receiving apparatus.

11. The surveillance system of claim 10, wherein the radar receiving apparatus is configured to estimate the signal distance of the object further based on the synchronization signal.

12. A surveillance method comprising:
receiving, at a radar receiver, an output radar signal transmitted from a radar transmitter and a signal reflected from the object, the reflected signal obtained by reflection of an output radar signal transmitted from the radar transmitter, which is separately disposed from the radar receiver and the object in a surveillance zone;
estimating a signal distance of the object which is a sum of a distance from the radar transmitter to the object and a distance from the object to the radar receiver, based on the reflected signal and the output radar signal;
transmitting a synchronization request signal from the radar receiver to at least one of the radar transmitter and a server;
receiving, at the radar receiver, a synchronization signal from the at least one of the radar transmitter and a server in response to the synchronization request signal; and
synchronizing, at the radar receiver, with the at least one of the radar transmitter and the server using the synchronization signal,
wherein the synchronization request signal comprises a first time stamp indicating a time when the radar receiver transmits the synchronization request signal to the at least one of the radar transmitter and the server,
wherein the synchronization signal comprises a second time stamp indicating a time when the at least one of the radar transmitter and the server transmits the synchronization signal to the radar receiver, and
wherein the synchronizing at the radar receiver is performed by calculating an error value by using the synchronization signal.

13. The method of claim 12,
wherein the signal distance of the object is estimated further based on the synchronization signal.

14. The method of claim 12, wherein the second time stamp further indicates a time when the at least one of the radar transmitter and the server receives the synchronization request signal, and
wherein the calculating the error value is performed further using a time when the radar receiver receives the synchronization signal.

15. The method of claim 12, further comprising
transmitting a synchronization request signal from the radar transmitter to the server,
receiving, at the radar transmitter, the synchronization signal from the server in response to the synchronization request signal, and
synchronizing, at the radar transmitter, with the radar receiver using the synchronization signal,
wherein the synchronizing at the radar transmitter is performed by calculating an error value by using the synchronization signal.

16. The method of claim 12, further comprising
receiving, at a video processing device, the signal distance from the radar receiver to detect a location of the object, and
generating a control signal for controlling a camera to be directed toward the object, to control a photographing direction of the camera.

* * * * *